June 4, 1940.                W. F. KELLEY                2,203,355
                          STATISTICAL CARD PUNCH
              Filed July 23, 1938            11 Sheets-Sheet 1

INVENTOR
W. F. KELLEY
BY *W. A. Sparks*
ATTORNEY

June 4, 1940.   W. F. KELLEY   2,203,355
STATISTICAL CARD PUNCH
Filed July 23, 1938    11 Sheets-Sheet 2

INVENTOR
W. F. KELLEY
BY *H. A. Sparks*
ATTORNEY

June 4, 1940.                W. F. KELLEY                 2,203,355
                         STATISTICAL CARD PUNCH
                       Filed July 23, 1938      11 Sheets-Sheet 3

INVENTOR
W. F. KELLEY

BY *W. A. Sparks*
ATTORNEY

June 4, 1940.  W. F. KELLEY  2,203,355
STATISTICAL CARD PUNCH
Filed July 23, 1938  11 Sheets-Sheet 4

INVENTOR
W. F. KELLEY
BY *W. C. Sparks*
ATTORNEY

June 4, 1940.  W. F. KELLEY  2,203,355
STATISTICAL CARD PUNCH
Filed July 23, 1938  11 Sheets-Sheet 5

INVENTOR
W. F. KELLEY
BY W. A. Sparks
ATTORNEY

June 4, 1940.  W. F. KELLEY  2,203,355

STATISTICAL CARD PUNCH

Filed July 23, 1938   11 Sheets-Sheet 6

INVENTOR
W. F. KELLEY

BY *H. A. Spark*
ATTORNEY

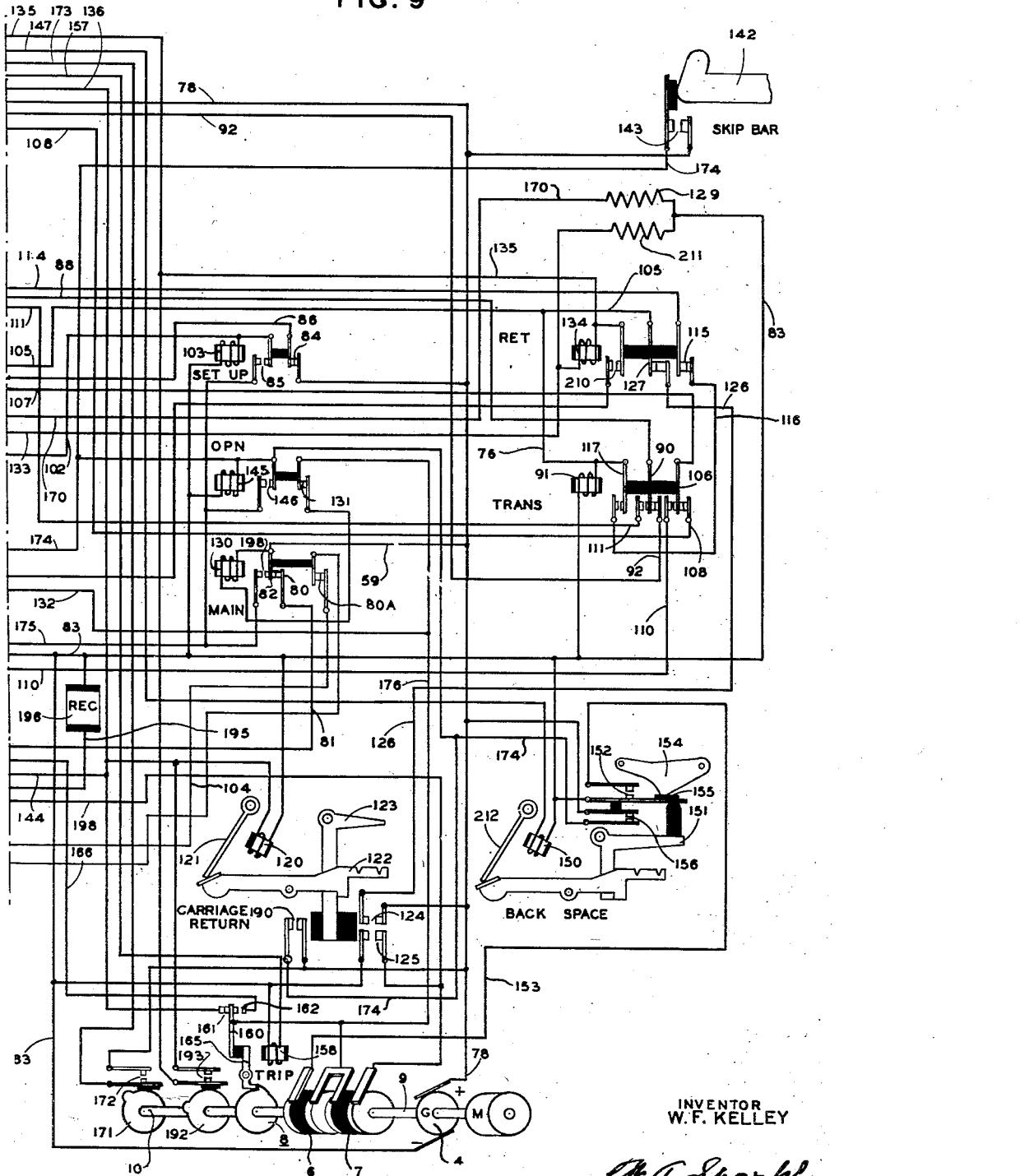

June 4, 1940.  W. F. KELLEY  2,203,355
STATISTICAL CARD PUNCH
Filed July 23, 1938   11 Sheets-Sheet 8

INVENTOR
W. F. KELLEY
BY W. A. Sparks
ATTORNEY

June 4, 1940.   W. F. KELLEY   2,203,355
STATISTICAL CARD PUNCH
Filed July 23, 1938   11 Sheets-Sheet 9

FIG. 11

INVENTOR
W. F. KELLEY
BY W. A. Spark
ATTORNEY

June 4, 1940.  W. F. KELLEY  2,203,355
STATISTICAL CARD PUNCH
Filed July 23, 1938   11 Sheets-Sheet 10
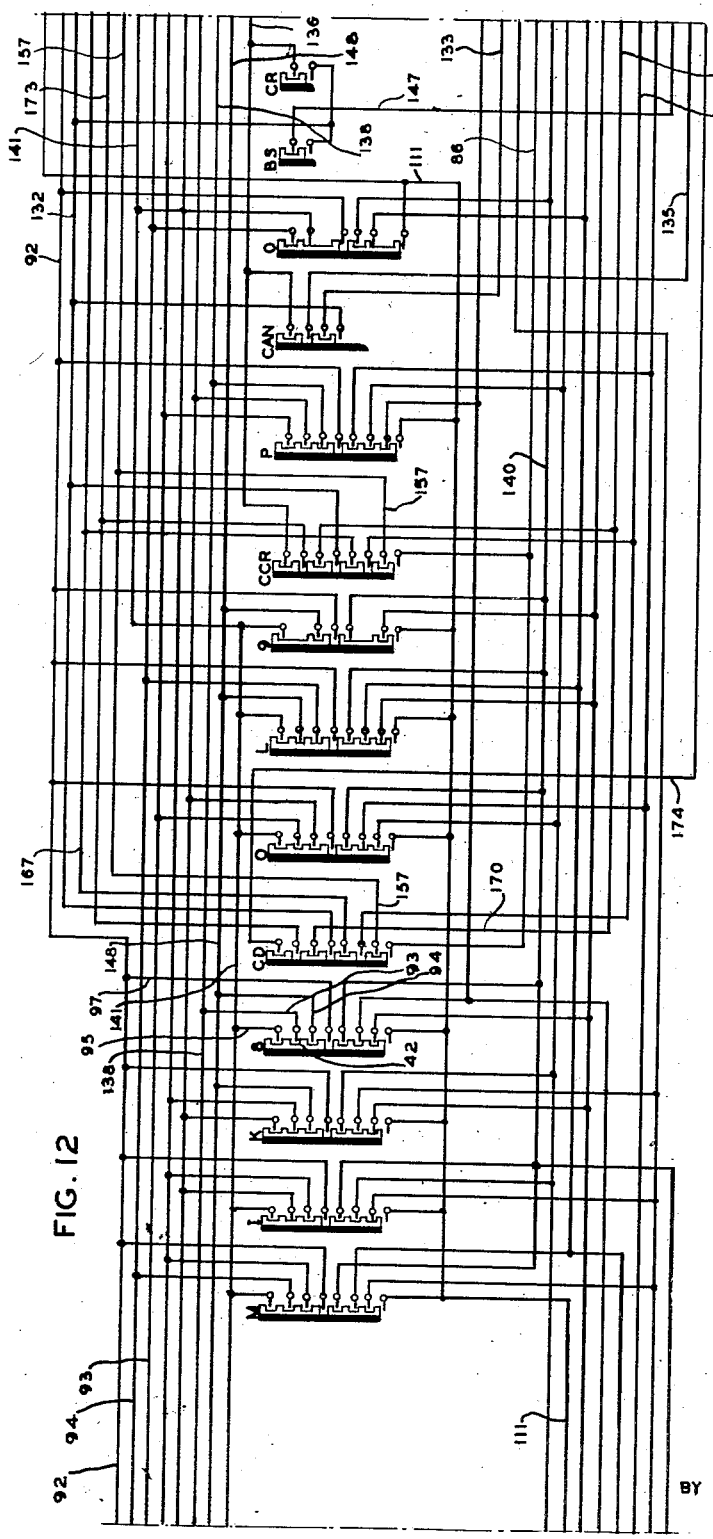
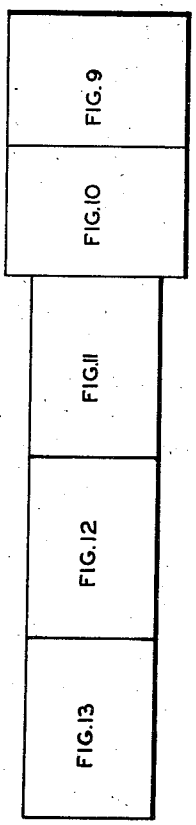
INVENTOR
W. F. KELLEY
BY
ATTORNEY

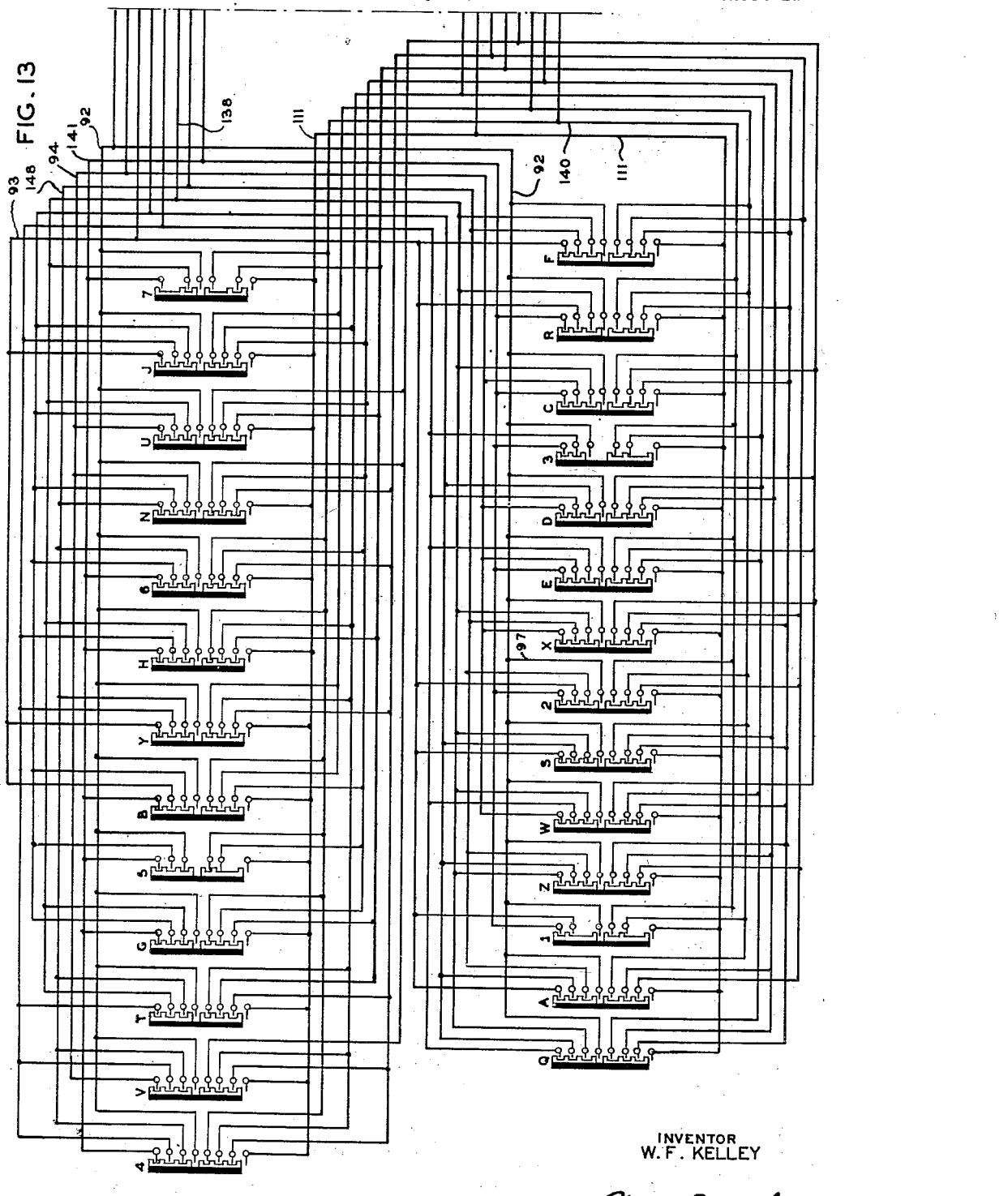

Patented June 4, 1940

2,203,355

UNITED STATES PATENT OFFICE 2,203,355

STATISTICAL CARD PUNCH

Walter F. Kelley, Whitestone, N. Y., assignor to Remington Rand Inc., Buffalo, N. Y., a corporation of Delaware Application July 23, 1938, Serial No. 220,863

26 Claims. (Cl. 164—113)

This invention relates to improvements in card punches for cards used in statistical machines, and relates more particularly to the keyboard actuating mechanism used on these machines.

Statistical-card punches with electrically operating keyboards have been disclosed and described in other patents. Patent No. 1,985,101 to W. W. Lasker discloses a punch in which the keyboard is fully electric and the controlling mechanisms are actuated by keys or switches which close electrical contacts. Patents 2,044,707 and Reissue 20,720, May 10, 1938, (original 2,044,708), also to Lasker, disclose further improvements in electrical keyboards which control and operate card punches. These disclosures, however, are either on the "open" type of keyboard or on mechanically locked key levers without the refinements disclosed herein.

The present invention is on a "closed" type of keyboard which provides numerous advantages over the old types, such as, the combination of mechanical and electrical interlocking means so that after the initial depression no other key may be actuated, and if a key is held down longer than is necessary, only the corresponding operation is performed. Also, the invention provides a mechanism which will continue the operation until it is completed, regardless of how short a time a fully depressed key has been held down and in such an instance, no key may be depressed, not even the operation initiating key, until after the operation is completed.

The mechanism which accomplishes the above results, consists of the following cooperating devices; a lockable latch under each key, a series of contact lugs attached to these latches, an armature engaging a master mechanical lock which is operated by a solenoid and engages all of the said latches, two pairs of key operated contacts which control the actuation of the said solenoid, and relays with holding circuits controlling the punch actuating mechanism.

When a key is depressed, the immediate result is a transverse movement of the key latch member toward the solenoid and the breaking of two contacts. Following this, the armature springs away from the solenoid due to the previous circuit break, and by means of the master lock, all the key latches are securely engaged, the unoperated members being held in their normal position while the operated latch member is locked in its transverse position. A further result of the solenoid release is the forcing down of the key latch, whereby the lugs on its middle portion are connected to contact spring members. As soon as the latch contacts are effected, the punch operation proceeds, being actuated by other solenoids, clutches, and contact springs to be hereinafter described in detail.

At the end of the punch operation, provision is made to break any holding circuit set up by the original latch contacts. Also, at the end of each operation, if all keys are up, a contact is effected which completes a circuit through the master solenoid, attracting the armature again and unlocking the keyboard. This action normalizes the keyboard and places it again in condition to transmit a new actuating impulse.

The object of this invention is to provide a statistical-card punch with a single action locked keyboard which will insure completed operations.

Another object of the invention is to provide the continuation of any operation until its completion thereof, regardlessly of the subsequent position of the controlling key.

Another object of the invention is to provide a locking mechanism which prevents any key, not fully depressed at the time of locking, from performing its designated action.

Another object of the invention is to provide a key lock mechanism which will not be disengaged until the operation is completed and the actuating key is fully released.

Another object of the invention is to provide a keyboard which will automatically be locked in case of failure of any essential mechanism or circuit.

Another object of the invention is to provide a locking mechanism which will prevent a second depression of an actuating key until after the first operation is completed.

Another object of the invention is to provide a limiting mechanism which will permit only a single operation of each single depression of the controlling key, regardlessly of how long the key is held in a depressed position.

Another object of the invention is to provide a keyboard for a recording machine which will lock all unactuated keys in their normal position when one key has been depressed and also lock the actuated key in its normal position if it is released before the operation is finished.

Another object of the invention is to provide a keyboard for a recording machine which will permit the simultaneous depression of any number of keys but after such depression, no key may be actuated until all the depressed keys have been released and the sum total of operations completed.

Another object of the invention is to provide a keyboard for a recording machine with an electromagnetically operated locking bar adapted to engage a portion of the key levers when one or more keys have been actuated.

Other objects and structural details of the invention will be apparent from the following description when read in connection with the accompanying drawings, wherein:

Fig. 1A is a view of the escapement bail and contacts;

Figure 15:
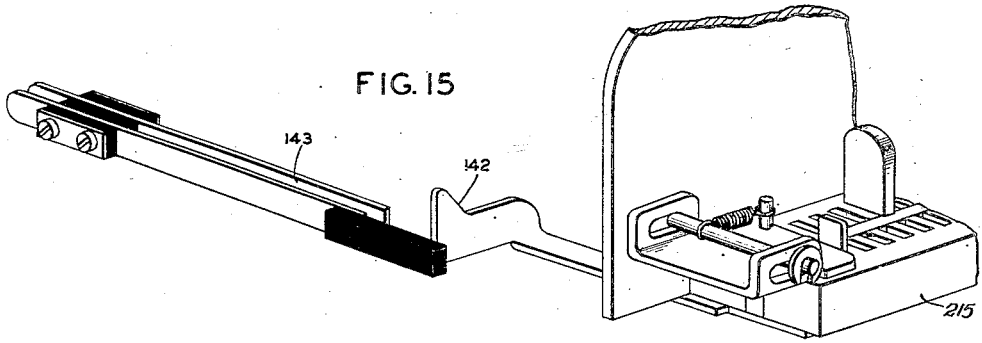

Figs. 9–13, inclusive, are the several sheets of wiring diagrams which together make up a complete circuit diagram of the invention;

Fig. 14 illustrates how Figs. 9–13, inclusive, should be assembled to reproduce the unit diagram; and Fig. 15 is an isometric drawing of the skip bar mechanism and its associated contacts.

Since the present invention involves the use of a card punch, differing in many respects from any previously described, the punching mechanism will be described first. The following list of punch operations and switch designations with brief definitions of each may aid in the understanding of this specification.

*Space (SP).*—Carriage of punch advances one space or column.

*Back Space (BS).*—Carriage returns one space.

*Skip (SK).*—Carriage advances to a settable stop.

*Carriage Return (CR).*—Carriage returns without cancellation to intermediate or to marginal stop as per switch setting.

*Erase (ER).*—Eliminates any set-up in any column in either upper or lower zone as per switch setting and initiates a space operation.

*Cancel (CAN).*—Carriage returns with cancellation of any set-ups in both upper and lower zones to intermediate or to marginal stop as per switch setting.

*Card (CD).*—Operates punch to give a punched card without carriage movement or any cancellations.

*Card, Carriage Return (CCR).*—Machine punches one card and carriage returns to margin or intermediate stop without cancellations.

*Trip.*—Machine punches one card and carriage returns to margin with cancellation of both zones.

*Trip to Intermediate (T—I).*—Same as Trip, except carriage stops at intermediate stop.

*Trip 2 (T—2).*—Same as Trip, except machine punches two cards instead of one and carriage returns either to margin or to the intermediate stop depending upon the switch setting.

*Low.*—Sets transfer relay for set-up in the lower zone.

*Up.*—Sets transfer relay for set-up in the upper zone.

SWITCHES

*On-Off.*—Disables the punch keyboard while the punch is under control of a translator or business machine.

*Single-Repeat.*—The setting of this switch at Single provides for the normal operation of the keyboard. When switch is thrown to Repeat, the whole keyboard is locked and the machine continuously punches cards without carriage return or cancellation until switch is thrown to Single again.

*Margin - Intermediate (MAR - INT).*—Determines whether the carriage will return to the margin or to the intermediate stop when Carriage Return; Card, Carriage Return; Trip 2; or Cancel keys are operated.

GENERAL PUNCH ASSEMBLY

Figure 1:
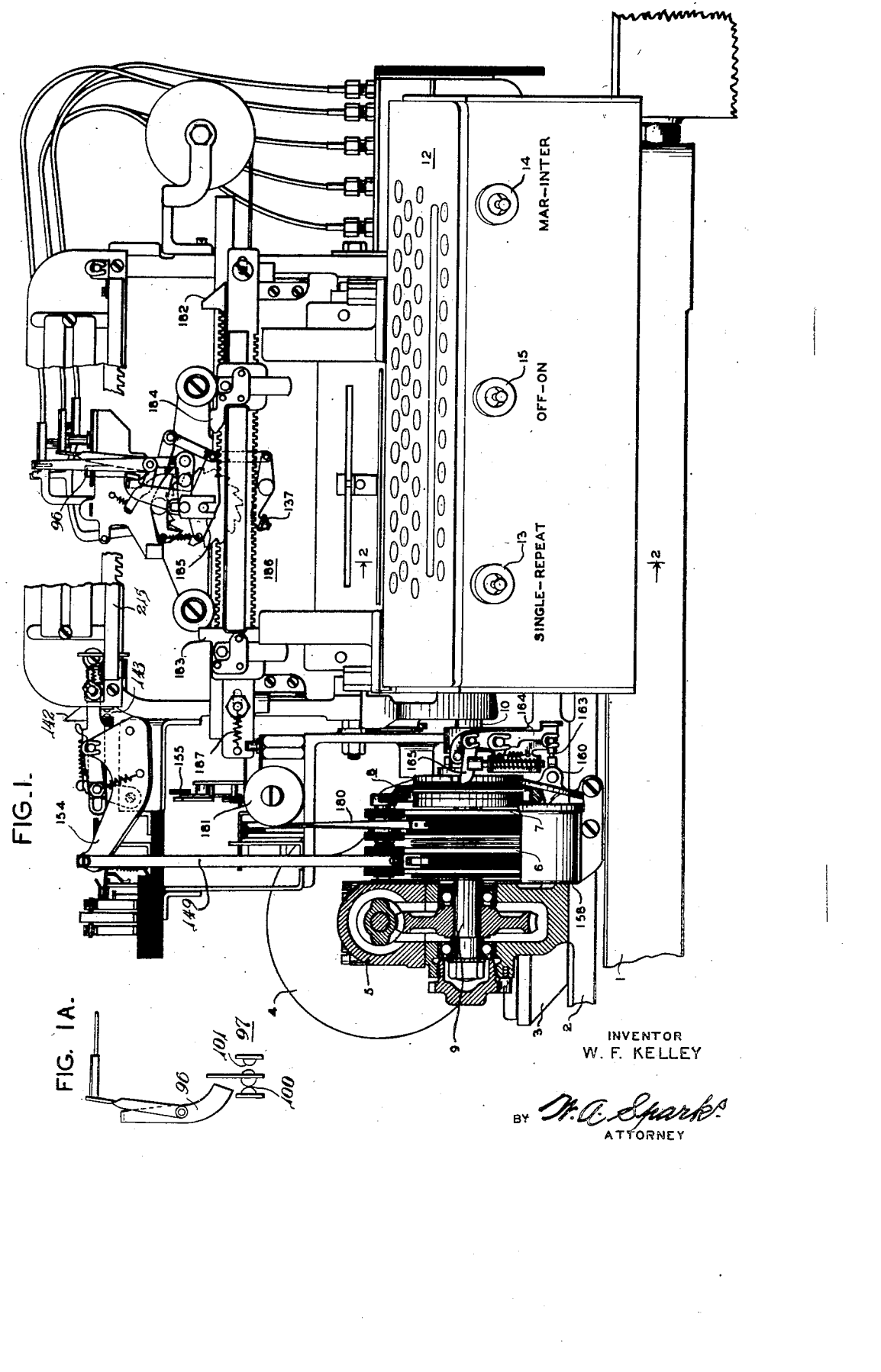
Fig. 1 is a general view of the entire punch mechanism.

Fig. 1 illustrates the general punch assembly which may be regarded as being made up of several cooperating groups of members. These groups are: The supporting framework; the driving mechanism comprising the motor with its gears and clutches; the punching mechanism consisting of a die with 540 openings together with corresponding punches, guides and card handling devices; the setting carriage with its set bars, Bowden wires, and erase mechanisms; the relays; and the keyboard.

All these members are mounted on a main frame 1, which is mounted upon legs (not shown) to bring the keyboard to the proper operable height from the floor. Mounted upon the main frame 1 is a smaller frame 2 and an auxiliary bracket 3 upon which is mounted a motor-generator set 4. Driven from a speed reduction mechanism 5 and mounted upon short shaft 9 are three clutches 6, 7, and 8; clutch 6 being for backspace, clutch 7 for carriage return, and clutch 8 for driving shaft 10, the axis of which is directly in line with that of shaft 9, and upon which there are mounted the several driving members for the various punch operating mechanisms. These driving members include a gear which drives the card handling mechanism, a box cam which operates the die for the actual punching operation, and a shaft which controls certain timing contacts to be described in detail hereinafter.

The application of the present invention to a statistical card punch, modifies and simplifies the wiring, and eliminates the commutator and eight relays that were previously used. However, the mechanical operations of feeding the cards into the punch die, operating the die, and ejecting the card, are the same as those described in the patents referred to above. A detailed description of the mechanism may also be found in copending application, S. N. 151,870 filed July 3, 1937, by Walter F. Kelley, now Patent 2,160,152, May 30, 1939. The set bars, setting carriage and solenoids are also the same as in the above mentioned application.

KEYBOARD (Figs. 1, 2, 3, 4 and 7)

Figure 7:
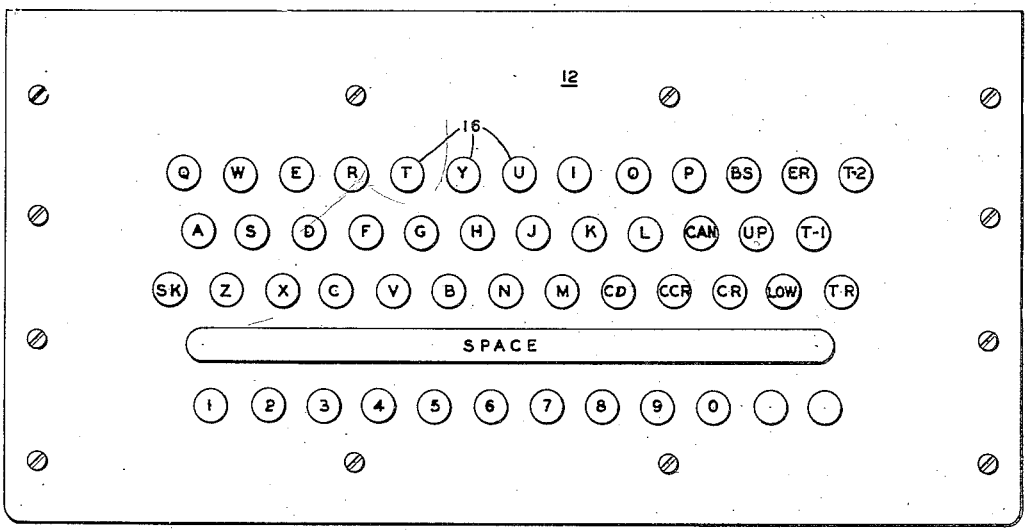
Fig. 7 is a plan view of the keyboard showing the keys and their designations.

The arrangement of the keys on the keyboard 12 is immaterial so far as the fundamental operation is concerned. The key designations as indicated in Fig. 7 are the same as those of the standard typewriter keyboard except for some operation control keys which have been placed at the right-hand side. The keys include a full alphabet and numerals from "0 to 9" for the data designations which are punched in the card by the punch die after the setting carriage has completed its set-up. There are thirteen keys which control punch operation (Space, Back Space, etc.), the functions of which have already been noted. Also on the front of the keyboard 12 there are mounted three manual switches to be set by an operator to control various functions. These switches are Single-Repeat switch 13, Margin-Intermediate stop switch 14, and On-Off switch 15.

Figure 2:
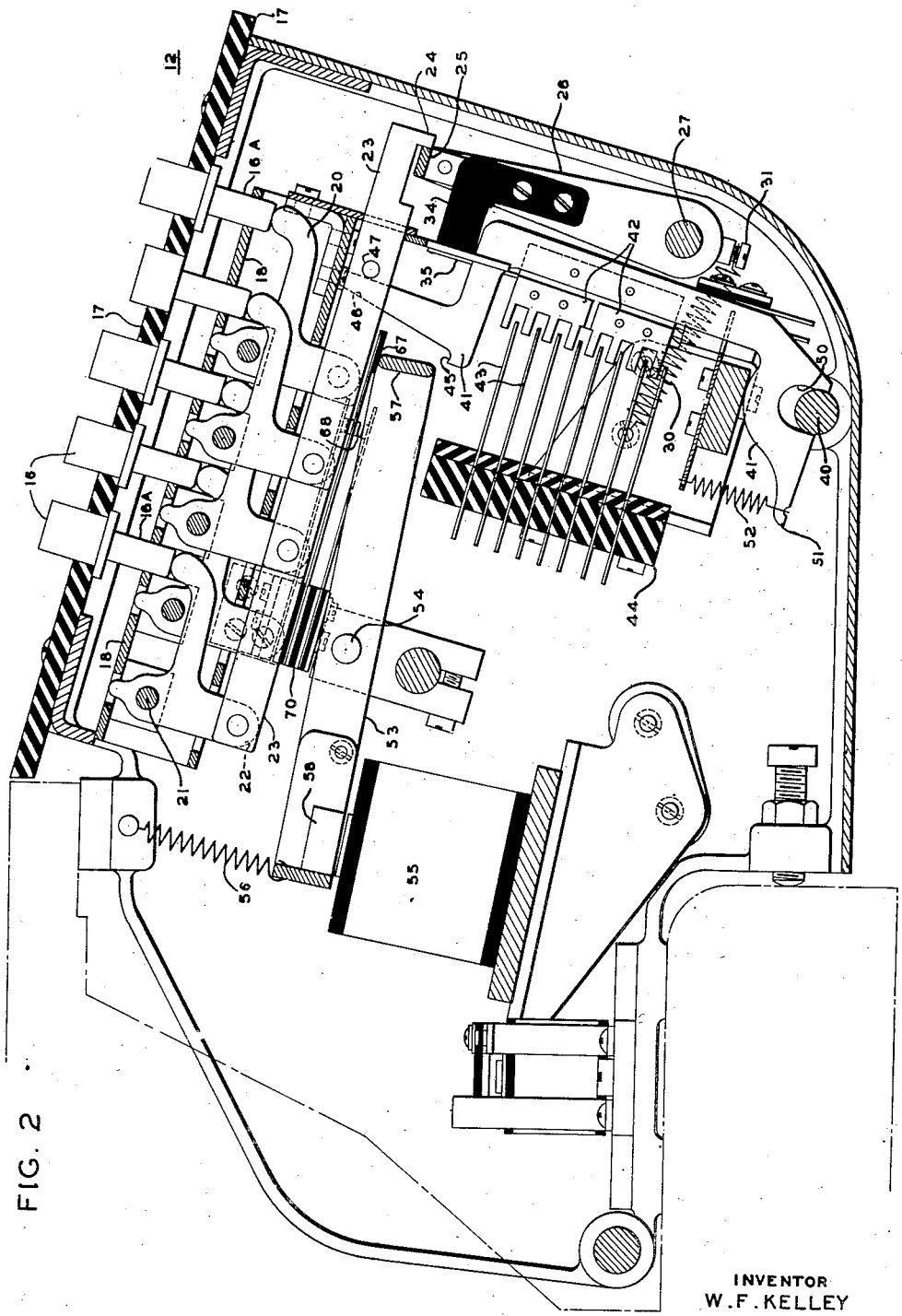
Fig. 2 is a sectional view of the keyboard taken from the side of the punch substantially along line 2—2 of Fig. 1.
Figure 3:
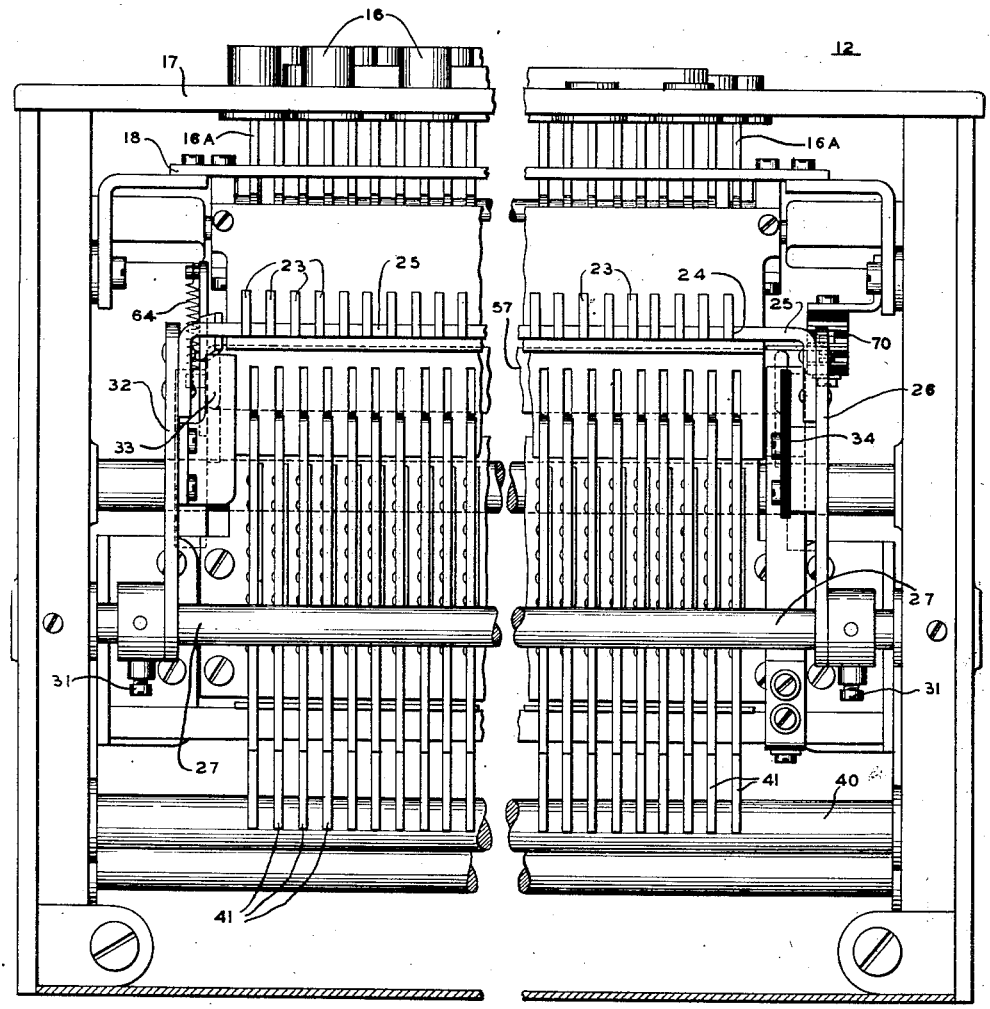
Fig. 3 is a fragmentary front view of the keyboard with the front cover removed.

Fig. 2 illustrates the interior of the keyboard case. The keys 16 extend through the panel 17, the key stems 16a being slidably held in a subpanel 18. The bottom portion of the key stems 16a are supported by bell-crank levers 20, pivoted on shafts 21 running the entire length of the keyboard. The bottom portions 22 of the bell-crank levers 20 are pivotally attached to horizontal bars 23, one bar for each key, and these bars are all extended to the front portion of the keyboard housing where an end hook portion 24 engages a bail bar 25, which runs the length of the keyboard and is engaged by all the horizontal bars, forty-nine in all.

The bail 25 is supported by two levers 26 and 32, one at each end of the machine (see Fig. 3), the levers being pivotally supported on the rod 27. A spring 30, one end of which is attached to the case and the other end to the projection 31, formed on lever 26, provides a resilient force which tends to move an insulator 34 to permit the opening of contact 37 and cause the opening of contact 36 as follows:

Attached to the lever 32 is a stop arm 33 which is designed to limit the range of action of the lever 26 when certain other operations have taken place. Secured to the lever 26, is an insulator block 34 which engages a leaf 35 of a pair of contacts 36 and 37. When any one of the keys is depressed, the bar 23 pulls on the bail 25 and moves the lever 26 to the left (Fig. 5), so that the insulator 34 permits contact 37 to open and opens contact 36, the contacts being so adjusted that contacts 37 open when the key has been depressed about 10% of its total travel and the contacts 36 are opened when the key has progressed approximately 90% of the limit. The contacts are made at the same points when the key is released.

As will be hereinafter disclosed in the description of the circuits, the breaking of contacts 37 as the key is depressed, produces no effect, but the breaking of contacts 36 locks the keyboard and starts the action.

When the key is released, the closing of contacts 36 produces no effect, but the closing of contacts 37 as the key is fully normalized unlocks the keyboard, provided the operation is concluded. Since the locking of the keyboard is deferred until after the key has been almost fully depressed, there will be no results from partial depressions such as might occur from accidental touching of the keys or the use of them as guide points. Similarly, since the unlocking of the keyboard is also deferred, until the key is almost entirely released, unsteady pressure while the key is down has no effect. If a key is fully released while an operation is in progress, the key will be held up until after the operation is completed. This is especially useful where double letters, etc., are used.

Figure 4:
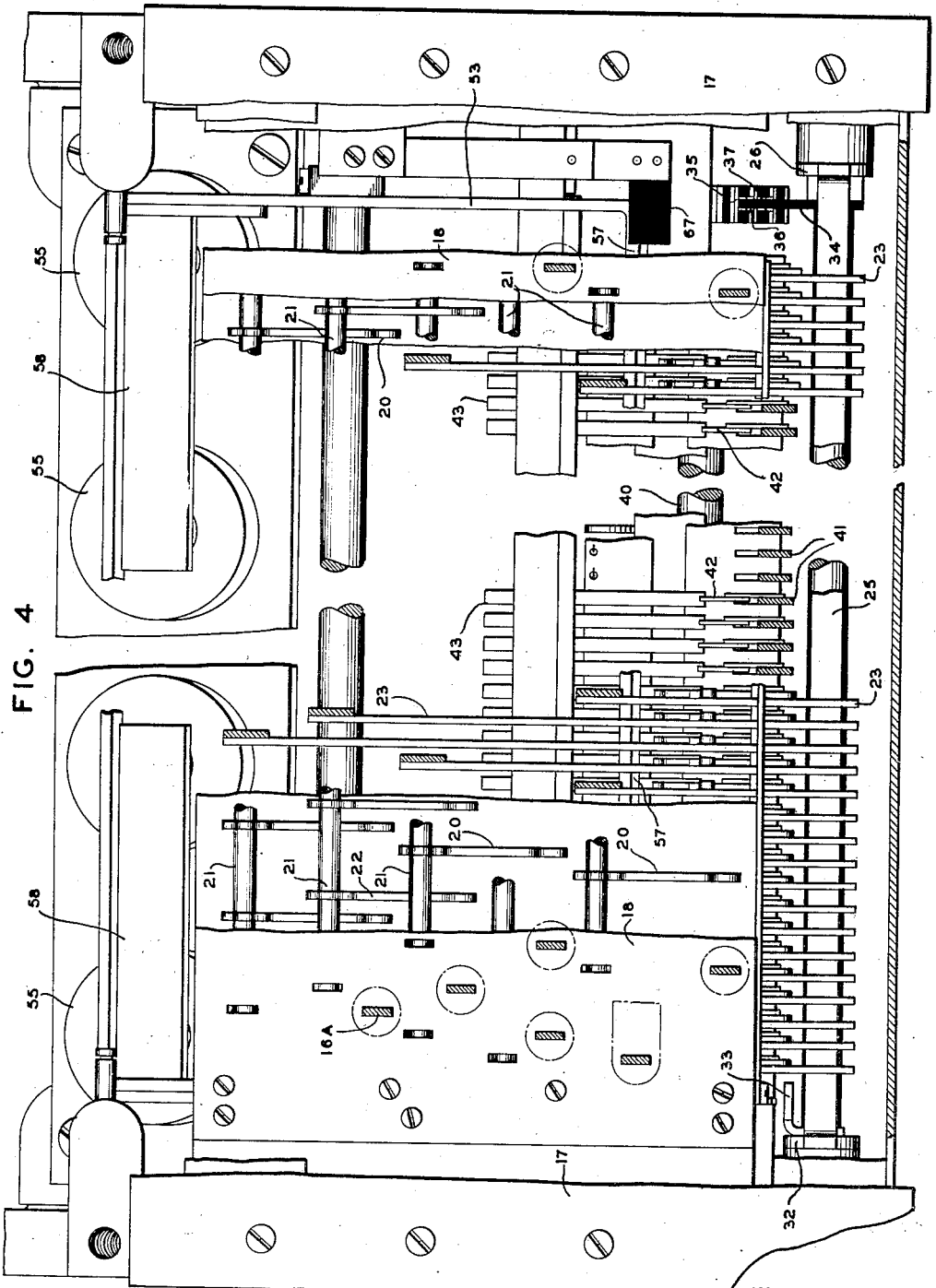
Fig. 4 is a fragmentary plan view of the keyboard with certain parts cut away.
Figure 5:
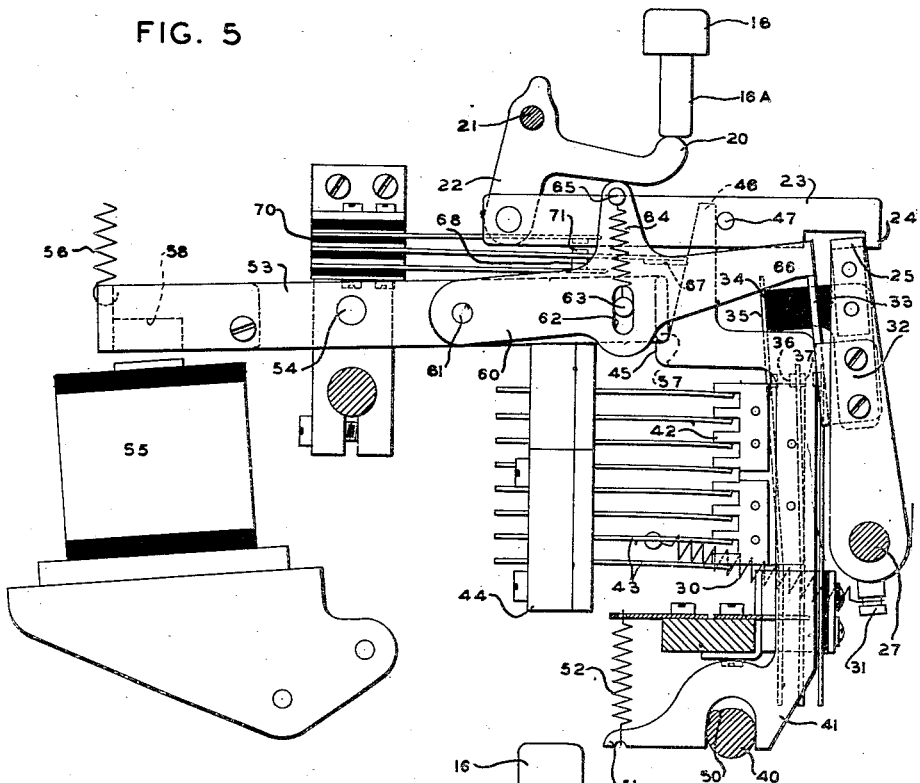
Fig. 5 is a side view of the latch locking mechanism with a key depressed two-thirds the full amount during the initial operating motion.
Figure 6:
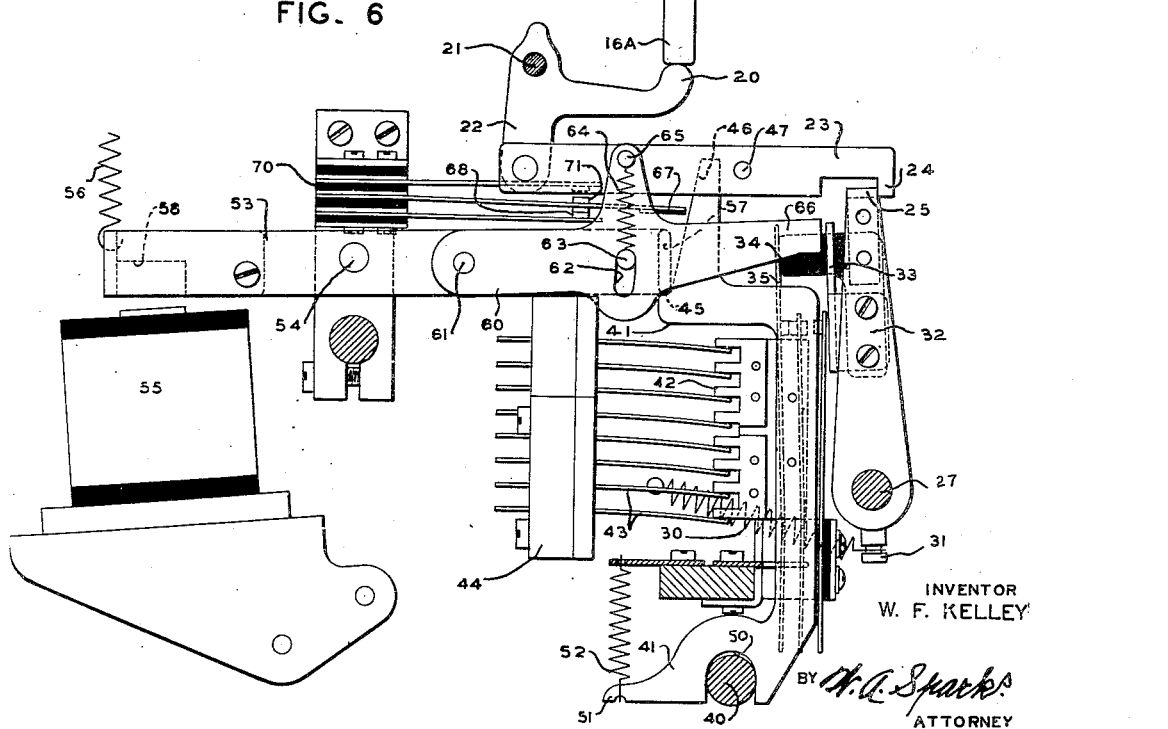
Fig. 6 is the same as Fig. 5, except that the key is midway between its normal and depressed position, being returned after the actuating operation.

At the bottom of the keyboard case, a transverse rod 40 is provided which acts as a base mounting for a series of contact carrying members 41, one for each key, which use the bar 40 as a pivot and also as a support for sliding action. The contact carrying member has mounted upon its central portion, a series of conducting plates 42 which are designed to engage spring contact members 43 securely mounted between non-conducting blocks 44. In Figs. 2, 4, and 5 the contact plates 42 are shown as consisting of two plates, each having four fingers formed thereon, which when depressed downwardly, electrically connect the four contact springs. For some operations, only the first two contacts are connected and in others the eight springs will be inter-connected in various combinations. The upper part of the member 41 consists of hook portion 45, and a finger 46 which extends past the bar 23 and is engaged by a pin 47 attached to the bar. At the bottom of the member 41, a slot 50 is provided to engage the bar 40, and an extended portion 51 is used to anchor a spring 52 which pulls the contact member 41 upwardly and tends to rotate it in a clockwise direction. The rotating action presses the finger 46 against the pin 47 and by action through the bell-crank lever 20, resiliently holds the key in its normal position.

Figure 8:
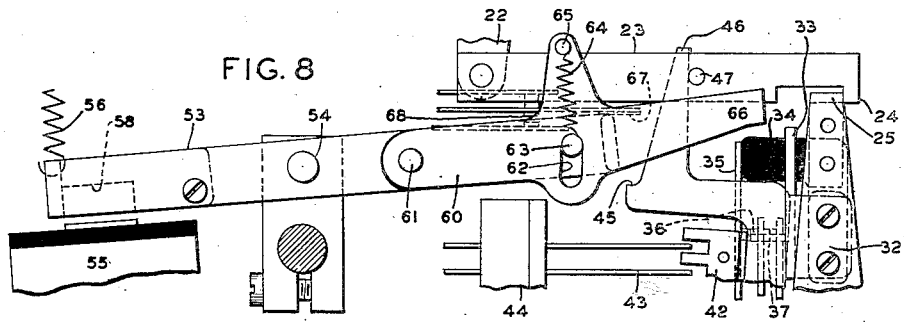
Fig. 8 is a side view of the latch mechanism with some parts cut away showing the normal position of the mechanism before operation.

The device which locks the key mechanism either in or out of their operating positions, consists of a rectangular frame 53 (Figs. 2, 4, 5, 6, and 8) pivoted at its two short sides on a pin 54. Secured to the frame 53 are two armature members 58 which are acted upon by magnet coils 55 of which there are four operating simultaneously. The frame 53 is normally held in the position of Fig. 8 by the magnets 55. Tending to oppose the action of the magnets is a spring 56 which is connected between a pin on the casing and the solenoid end of the frame 53. The side of the frame 53 opposite from the armature 58 forms a bail 57 which extends across the keyboard and either drops in front of the contact member 41 or engages the hook portion 45 thereof.

When the operating circuit of the magnets 55 is broken the lever 53 rocks clockwise (Figs. 5 and 6) under the action of spring 56, thereby bringing the bail 57 into contact with the hook 45, pressing member 41 downwardly, thus connecting contactors 42 and contact springs 43.

An additional lever 60 is added as a part of the locking frame 53 to prevent a second actuation of the key before the first operation is completed. The lever 60 is pivoted on a pin 61 which is attached to the locking lever 53 and is limited in its rotary motion by a slot 62, cut in its middle portion, engaging a pin 63 secured to the lever 53. A spring 64 is connected between the pin 63 and an extended portion 65 of the auxiliary lever 60, so that the lever is strained downwardly at all times. The end portion 66 of lever 60 engages the top of the stop arm 33 when the key 16 is first depressed (Fig. 5) and if the operation requires a comparatively long time to complete, such as Card, Carriage Return or Trip-2, the key may be raised some time before the operation is finished. In such a case, the levers 26 and 32 and the bail 25 will return to their normal positions, and the end portion 66 of lever 60 will fall in front of the stop arm 33 (see Fig.

6), and prevent another depression of the key 16 until the keyboard is normalized.

The cross bar 57 which engages the hook member 45 also has another function. Its top surface engages a flat insulator block 67 attached to the middle leaf of a double contact switch, the other ends of which are securely fastened to the casing by means of an insulator block 70. During the non-operating period when the solenoid holds down the lever 53, the two upper contacts 71 of the switch are made and the two lower contacts 68 are open. During the operating period when the current in the magnet 55 is cut off, the reverse is true.

The apparatus described above is all positioned directly below the keyboard and may be considered as part of it. Other electrical apparatus cooperating with the keyboard apparatus to produce the required operations, include six relays, three clutches, a back-space control, a carriage-return control, two leaf contact switches operated by the skip bar and the set-up bail respectively, cam contacts, a semaphore, and twenty solenoids which actuate the set-up apparatus.

A schematic representation of each of these is shown in the wiring diagrams (Figs. 9 to 13, inclusive) and their action will be described along with the description of the circuits.

CIRCUITS

Figure 10:
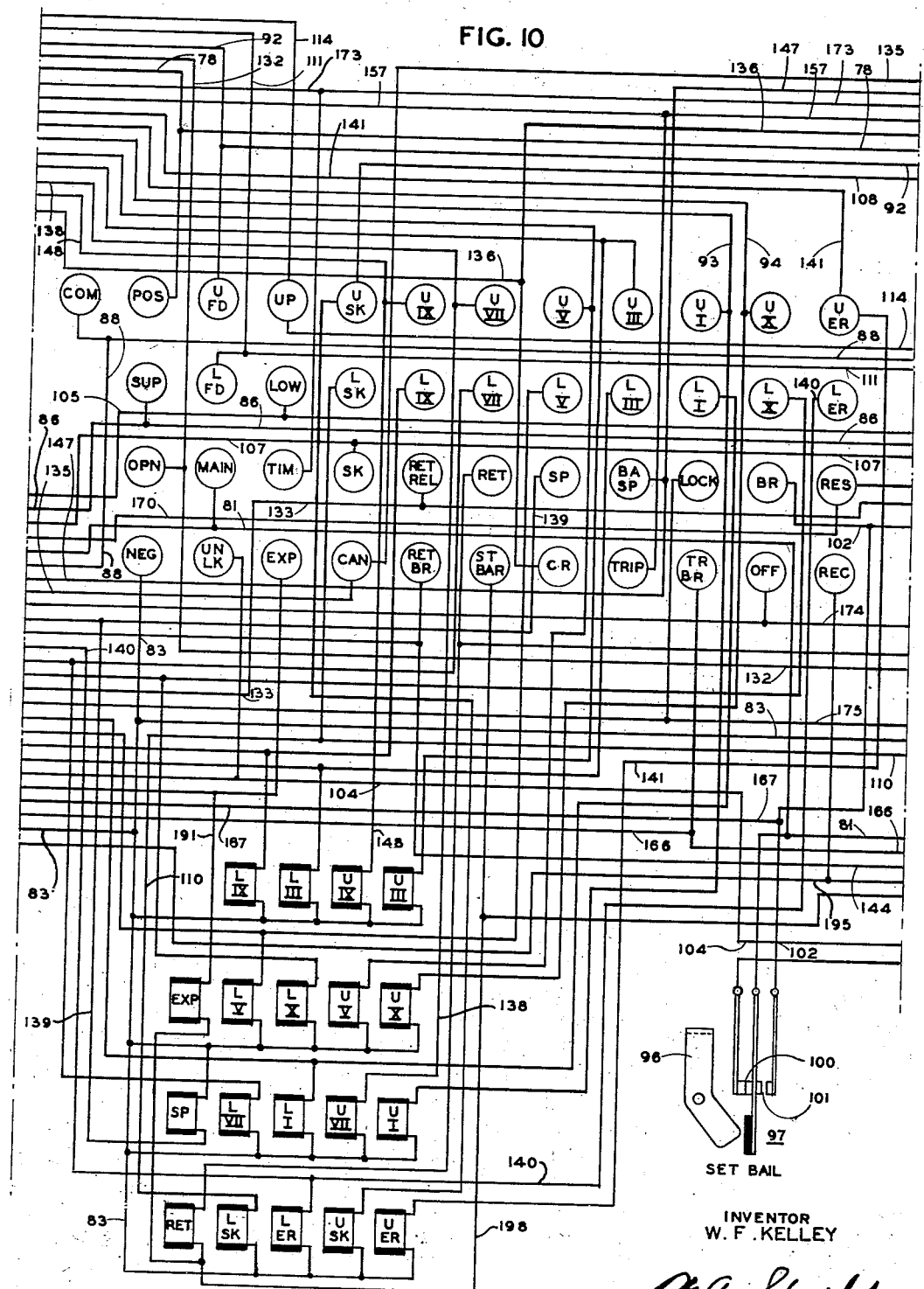

Figs. 9, 10, 11, 12, and 13 when assembled, as shown in Fig. 14, illustrate schematically the complete operating circuit of the present invention. In this circuit the various mechanisms are shown as set for punching in a full alpha-numeric 90-column code, but it is evident that conversion is possible to any type card or any code. The general content of these figures is as follows: Fig. 9 illustrates the circuits for the relays, clutches, back-space and carriage-return controls and the skip bar; Fig. 10 illustrates the circuits for the terminal board, the solenoids and the set-up bail; Fig. 11 illustrates the circuits for the three control switches, the semaphore, the circuits controlling the keyboard lock and contact lugs which are carried by the vertical locking latches under each of the keys as designated; and Figs. 12 and 13 illustrate the remaining forty-one contact latches necessary for a complete alpha-numeric keyboard.

The electric motor generator 4 (Fig. 9) is connected by suitable gearing to the three clutches 6, 7, and 8, and when clutch 8 is engaged, the shaft which carries the two contact cams 171 and 192 is rotated. The direct current used for all electrical operations is derived from the motor generator 4.

The terminal board (Fig. 10) consists of a panel containing a number of terminals arranged approximately as indicated. In order to expedite assembly and simplify testing, many connections, including all required between the punch and the keyboard, are made here.

The arrangement of contacts under each key with provision for power operation of the contact member and locking mechanism, simplifies the remainder of the wiring and eliminates a number of relays which were formerly used in a device of similar character.

The transfer switch, which changes the set-up operating zone from upper to lower, formerly had seventy contacts, but in this circuit the number is reduced to ten and operation is accomplished by a simple relay.

The clutch 8 connects the continuously rotating shaft 9 with shaft 10 (Fig. 9) which operates the card handling mechanism as previously mentioned. Also operated by shaft 10, are two cams 171 and 192 which have rises engaging leaf springs which operate the contacts 172 and 193. These contacts are made only when the clutch is operated and their function will be described hereinafter in detail.

The On-Off switch has four pairs of contacts, connected in the "On" position and broken in the "Off" position. These four contacts connect (1) the supply wire to the common lead, (2) the positive conductor from the generator to the semaphore circuit, (3) the lock circuit with the lower spring of contact 68, and (4) the negative conductor from the generator to the unlock solenoid, through the Single-Repeat switch.

The Margin-Intermediate switch has only a single pair of contacts, connected at MAR and disconnected at INT. The switch joins the positive line to the express solenoid through closed contacts in the TR-INT switch and raises a stop member, permitting the carriage to move over the intermediate stop to the marginal stop.

The Single-Repeat switch contains two pairs of contacts. When thrown to Single, contact is made connecting one side of the unlock magnet to the negative conductor, permitting normal use of the keyboard. In this position the punching of cards is controlled by other circuits. When thrown to REP, the positive line is connnected to the trip magnet, which causes engagement of the trip clutch, and cards are perforated continuously with the usual trip control circuits rendered inoperative. During the REP setting, the keyboard mechanism remains locked.

SET-UP

When a letter or figure is to be set up in the set bar field by the setting carriage, the key corresponding to that letter or figure is depressed and the mechanical and electrical mechanisms associated with the locked keyboard operate as has already been described. Fig. 5 illustrates the condition of the keyboard contacts when the key has been depressed and the locking mechanism actuated. Three important circuit changes have been made, (1) the conducting combs 42 have engaged the springs 43, (2) the contacts 36 and 37 have both been opened, and (3) the contact 68 has been closed and 71 opened. These contacts and switches are shown with their full circuit connections in Fig. 11 and the associated diagrams, Figs. 9, 10, 12, and 13.

The set-ups are all made in a similar manner, the circuit connections and mechanical action being the same for each letter and figure, except that different combinations of solenoids are used to latch down different set bars in accordance with the Powers code. These different combinations are obtained by connecting the selective solenoid lead wires to the contact springs 43 and energizing the solenoid windings by means of the contact comb 42. Since the fundamental action is the same for all letters and figures, only one will be described.

When a key 16 is normal, the locking circuit is as follows:

From the positive generator conductor 78 to the armature 82 of the Main relay 130; through the contact points 80, over conductor 81; through the contacts 100 on the switch operated by the set bail 96; through contact 80A of relay 130; thence over the conductor 104, through contacts 37 on the switch operated by the key locking structure; through the winding of the unlock magnet 55; through the contact 200 of the single-repeat switch and the lowermost contacts 76 in the On-Off switch; thence over the conductor 83 to the negative generator terminal. In this manner, the entire line voltage is applied to the unlock magnet and its armature 53 is held down, unlocking the keyboard.

When a numeral or a letter key, such as the "8" key (Fig. 12), is depressed the contacts 36 and 37 are forced open by the insulator block 34 which is actuated directly by the key 16. The circuit described above for the unlock magnet 55 is broken at contacts 36, and the armature bar 53 is released, thus opening the contacts 71 and closing the contacts 68. The rotation of the bar 53 engages the hook portion 45 of the contact lever 41, and depresses it until the contact comb 42 comes in contact with the springs 43.

The current necessary to actuate the set up solenoids is supplied to all the key contact assemblies. If punching is being performed in the upper zone, the circuit is as follows:

From positive generator over conductor 78, through contacts 84, of the set up relay 103; over conductor 86 to the top contacts 87, of the On-Off switch; thence over the "common" conductor 88, to the middle leaf 90 of the transfer relay 91. The position of the armature of this relay is controlled by two other keys, Up and Low, whose action will be described later. While the transfer relay is in the "upper" position, as shown in Fig. 9, all set-ups will be made in the upper zone of the card. From the contact point 90, the circuit continues over conductors 92 and 97 (Fig. 13), to the lowest spring contact of all the upper key contact assemblies.

If the "8" key (Fig. 12) is actuated, the comb 42 associated therewith will close three additional circuits beside that prepared for positive current as described above. The digit eight in the ninety column code is represented by two holes corresponding to the digits seven and nine. The two solenoids, i. e., U—VII and U—IX, which cause the set levers to latch down the set bars for these positions, must be energized, and since there is the possibility that some former set up may still remain in the set bars, the erase solenoid U—ER must also be energized. The action of the erase mechanism is identical with the erase actions described in the previously mentioned patents. The erase solenoid operates simultaneously with the set up solenoids and rocks levers which engage two set bars and depresses them a predetermined distance to release the set bars which were previously latched down, then the erase mechanism is disengaged before the new set up is completed.

The first circuit is from positive conductor 78 on the fourth contact of the key "8"; through the comb 42 to the first contact, over conductors 95 and 141; through the U—ER terminal and the winding of solenoid U—ER; thence over conductor 83 to negative generator, thus actuating the upper erase mechanism. The second circuit extends from positive conductor 78 through the comb 42; second contact spring; conductors 93 and 138; through the winding of the solenoid U—XII; and thence to negative generator over conductor 83, thus operating the U—VII solenoid to actuate the "seven" set bar of the upper zone. The third circuit extends from positive conductor through the third spring, over conductors 94 and 148; through the winding of solenoid U—IX; and thence to negative generator over conductor 83, operating the U—IX solenoid, thus actuating the "nine" set bar of the upper zone.

As soon as the contact comb 42 connects the four "upper" springs 43, the solenoids are actuated and the associated set levers are moved to engage their respective set bars. In doing so they also rock the set bail 96 (Fig. 10) which operates the switch 97, thereby initiating four consecutive circuit changes. These changes occur when (1) contacts 100 are broken, (2) contacts 101 are closed, (3) contacts 101 are opened, and (4) contacts 100 are closed again. When contacts 100 are opened, no current can reach the unlock magnet 55 until the contacts are restored, even if the key is released early. Contacts 101 are spaced in such manner that they will not close until the spacing action is certain of accomplishment. When these contacts are made, a circuit is then completed from the positive generator over conductors 78 and 59; armature 82; contacts 80 of the main relay 130; conductor 81, through the contacts 101 of switch 97; conductor 102, through the winding of the set-up relay 103; and thence to negative generator over conductor 83, thus operating relay 103 and locking it.

The locking circuit for relay 103 runs from conductor 78 through contacts 80, 68, 77, 85, and their connecting conductors.

With the operation of the set-up relay 103, the contacts 84 are broken, thus removing positive current from "supply" conductor 86, thereby releasing the solenoids. In this manner, the completion of the solenoid setting operation automatically cuts off the power supply to the key contacts.

When the contacts 100 are made again, a circuit is established from the positive conductor 78 through contacts 80, 100, 80a, 37; magnet 55; contacts 200, and 76; to the negative conductor 83. This circuit is possible only after the key has been released.

If the key "8" is held in a depressed condition, the keyboard will continue to be locked because the contacts 37 are held open and therefore no current can reach the unlock magnet 55. As soon as the key is released, contacts 37 are closed and the unlock magnet is actuated, pulling down the lever 53 and unlocking the keyboard.

In the case of a simple set up, the action of the setting apparatus is so fast that the operation will generally be completed before the key is released. However, if the key action is faster than the solenoid set up, the unlock magnet 55 will not operate until the set up is completed and the bail 96 is returned to normal, making a circuit through the contacts 100 over which the magnet 55 must be energized.

LOWER

The key Low (Fig. 11) is used to shift the operations of the setting carriage from the upper to the lower zone. Since the switching is done by the transfer relay 91, it is only necessary that the "lower" key complete a circuit through the relay winding and hence only two contacts are used in the key assembly. When the key is depressed, the following circuit is completed:

From the positive conductor 78, through contacts 98 of the On-Off switch, to the contacts of the key Low; over conductors 105 and 76; through the winding of the transfer relay 91; and back to the negative conductor 83. This circuit operates the transfer relay 91 and moves the armature and associated contacts to the left (Fig. 9).

Three independent circuits are altered due to this switching; one is the transfer of the "common" conductor 88, from the "upper" conductor 92 to the "lower" conductor 111. This is done by the leaf contact 90. The leaf 106 switches the conductor 107 from the conductor 108, connecting with the upper skip solenoid U—SK, to the conductor 110, connecting with the lower skip solenoid L—SK. The Skip action and result will be described hereinafter in detail.

The third circuit, locking the transfer relay in the "lower" position, extends from the positive conductor 78, through the contact 98 of the On-Off switch; through the winding of the Semaphore solenoid 112; through the contacts 113, over the conductor 114, to the leaf contact 115 of the Retract relay 134; over conductor 116 and the leaf contact 117; through the winding of relay 91, to the negative conductor 83.

When the key Low is depressed, the contacts 36 and 37 are broken in the same manner as caused by any other key, thus breaking the circuit through the unlock magnet 55 and locking the keyboard as previously described, so that no other key may be actuated. However, both the upper and lower circuits are connected so as to unlock the keyboard as soon as the key is released. The transfer relay 91 will continue to hold its contacts in the "lower" position until the key Up is depressed.

UPPER

The key Up is used to shift the setting operations from the lower zone to the upper zone. This is accomplished by breaking the lock circuit of the transfer relay described above, at key contacts 113 which are normally closed and opened by depression of the Up key contactor 42. As this circuit includes the semaphore magnet 112, the latter will be released and the indicator will be moved to indicate "upper."

In addition to the transfer by the operation of a key, an automatic transfer is provided upon the return of the setting carriage. This provision is to allow the operator to compete the setting in the "upper" zone, return the carriage without cancellation and continue setting up data, which will automatically be placed in the "lower" zone. When the data for the card is complete, one of the Trip keys may be depressed and one or two cards punched; the carriage is again returned, this time cancelling the set up, and the Transfer relay 91 is thrown back to the "upper" position. This automatic feature involves the relays and circuits associated with the Trip actions, hence this part of the "upper-lower" transfer will be described under the "Trip" headings.

ERASE

The Erase key is included in the keyboard to permit the operator to eliminate any column set-up which has been made in the set bar field. The Erase mechanism acts to partially depress two set bars, the simultaneous use of which is not required by the code, as described in previous patents, etc. This partial depression is sufficient to release all the previously set and held set bars in the same column of the same zone, but is not depressed enough to permit the locking of the said two set bars. The erasing mechanism is automatically and mechanically released as soon as the action has progressed far enough to insure the release of the previously locked set bars as described. Two of these mechanisms are provided, one for each zone, and they are operated by Bowden wires moved by solenoids. The solenoids are represented in Fig. 10 at the bottom of the drawing and designated U—ER and L—ER.

When the Erase key is depressed, the unlock magnet 55 and associated locking mechanism operates, as hereinbefore described under Set-Up to lock the keyboard and keep it locked until the key has been released and the set bail 98 actuated. The contacting comb in the key lock assembly makes three independent circuits, one for spacing operation, and one each for the upper and lower erase solenoids, depending upon the setting of the Transfer relay.

The Space operating circuit is as follows: from the positive generator conductor 78, to contacts 84 on the Set-Up relay 103; over the conductor 86, through the On-Off switch contacts 87; conductor 88, through contact comb of the Erase key; thence over the conductor 139, through the winding of the space solenoid, SP, and from thence to the negative conductor 83.

Another operating circuit starts from the positive conductor 78, through the contacts 84 of the Set-Up relay, and the On-Off switch contacts 87 as before; thence over the conductor 88, through the contacts 90 of the Transfer relay 91; thence over the conductor 92 to the middle contactor on the comb of the key Erase; thence over the conductor 141 to the upper erase solenoid U—ER; and thence to negative conductor 83. If the Transfer relay 91 had been in the "lower" position, the circuit would have been over conductor 111 to the lowest contactor on the comb of the key Erase, and thence back over conductor 140 to the lower erase solenoid L—ER.

SPACE

Depressing the Space key moves the setting carriage to the right a distance corresponding to one column. The mechanical escapement which causes this action is the same as that described in the above mentioned patents and is actuated by a Bowden wire connected to a solenoid designated SP in Fig. 10. Besides actuating the escapement mechanism, the Bowden wire also moves the set bail 96, breaking contact 100 and making contact 101. This switching is necessary to unlock the keyboard as has already been described. The operating circuit for the solenoid SP is as follows:

From the positive conductor 78 through contacts 84 of relay 103; over conductor 86, through the top contacts 87 of the On-Off switch to the Space key contactor; back to the conductor 139, through the space solenoid SP; and thence to the negative conductor 83.

KEYBOARD CONTROL CIRCUITS

The operations produced by depressing the letter or numeral keys and the Space, Erase, Upper, and Lower keys are completed in a short space of time and involve relatively simple circuits. The remainder of the operations involve more complicated circuits and a more detailed description of the function of the keyboard control circuits will be given to make these operations more clear. The methods by which the control circuits produce "Single Action," "Completed Action," and a "Locked Keyboard" are similar in all the following operations and involve the two sets of contacts 36, 37, and 68, 71 in the keyboard; and three relays, Operation, Main, and Set-Up.

As a key is depressed, contacts 37 are the first to be broken, but this does not lock the keyboard because the unlock magnet 55 still receives current through contacts 36 and 71. When the key is near the end of its downward stroke, contacts 36 are broken and the unlock magnet releases its armature and the keyboard is locked.

When a key is released, contacts 36 are made first but the keyboard is not unlocked because contacts 71 are now open and the current to energize the unlock magnet must be made by way of contacts 37 which are not made until the key is nearly all the way up.

The contacts 37 are in series with the supply line of the unlock magnet 55 when the key is on its way up, but there are other contacts in this circuit and all of them must be made before the keyboard can be unlocked. These include the contacts 80 and 80A of the Main relay 130 and contacts 100 of the set up bail. Therefore, before the keyboard can be unlocked, three conditions must be satisfied; (1) the key must be up, closing contacts 37; (2) the set-up bail must be normalized, closing contacts 100; and (3) the Main relay 130 must be normalized, closing contacts 80 and 80A. All operations, except Up and Low, break one of these contacts as the operation is started and in all cases the contacts are held open until the end of the operation, thus assuring "Completed Action."

The start of all the operations, except "Set-Up" and "Space," is made by connecting the operation conductor 132 to the various control circuits. This causes the Main relay 130 to be actuated, breaking the contacts 80 and 80A, and thereby keeping the keyboard locked. To prevent premature opening of the Main relay, provision is made for maintaining current through its coil and contacts 131 until the completion of such operation.

The finish of any operation completes a circuit energizing the Operation relay 145, thereby causing the breaking of contacts 131 and the normalizing of the Main relay. One side of relay 145 is permanently connected to the negative line 83. The other side of the winding, conductor 174, is connected to the positive line 78 by the closure of any one of the contacts 143, 156, or 190, or under special conditions, contact 172. In "Carriage Return" and all operations ending with a return of the setting carriage, contacts 190 make this connection. In "Back Space," contacts 156 make the same finish connection. In "Skip," the skip bar 215 closes contacts 143 which are in parallel with 156 and 190, and in the "Card" operation, the Timer cam 171 is rotated so that it makes this same connection by closing contacts 172.

SKIP

The "Skip" operation moves the setting carriage to the right, to the nearest settable stop provided for that purpose. The mechanical mechanism associated with this operation is the same as that described in the above mentioned patents. When the carriage reaches and engages the skip stop, it moves the skip bar assembly 215 and 142 (Figs. 9 and 15) to the right, closing a pair of contacts 143 to complete a circuit for energizing the Operation relay 145.

When the Skip key is depressed, the keyboard is locked in the usual manner by the breaking of contacts 37. A circuit is then completed from the positive generator, over conductors 78 and 59; through the winding of the Main relay 130, to the contacts 131 of the Operation relay; thence over conductor 132 through the comb contactor of the Skip key, and thence over the conductor 107 to contact 106 of the Transfer relay 91. Depending upon the position of the Transfer relay, the circuit continues, either over the conductor 108 to the upper skip solenoid U—SK; or over the conductor 110 to the lower skip solenoid L—SK; and from either of these, back to the negative conductor 83. The actuation of either of these solenoids results in the skip operation as has been previously described in the above mentioned patents. At the conclusion of the Skip operation, the skip bar closes the contacts 143 and the following circuit results: from the positive generator over conductor 78 to the skip contacts 143, from there over conductor 174, through the winding of the operation relay 145, and thence to the negative conductor 83.

The actuation of the Operation relay breaks the contacts 131, thereby opening the operating circuit for the skip solenoids. As a skip solenoid is released, the projection on the carriage which engages the stop, falls back and releases the skip bar 215 which opens the contacts 143 again. If the Skip key is held down after the skip operation is finished, there will be no recurrence as the Operation relay 145 is locked. Due to the same holding circuit the contacts 131 will be held open. This holding circuit, which is broken when the keyboard is released, is as follows:

From the positive conductor 78 and 59; armature 82; through the contacts 80 of the Main relay 130; over conductor 81, through contacts 68, conductor 75, contacts 77 of the On-Off switch; thence over conductor 175, through the contacts 146, and winding of the relay 145; and thence to the negative conductor 83. This holding circuit assures the single acting characteristic of the skip operation.

BACK SPACE

The "Back Space" operation is used to obtain a motion of the carriage equal to a single space in the reverse direction from that travelled while setting up data. When the back space key BS is depressed, the key locking circuits are actuated and the following back space circuit is completed:

From the positive conductor 78 through the winding of the Main relay 130; thence through contacts 131 of the relay 145, and from there over the conductor 132 to the comb contactor of the Back Space key. This contactor connects the conductor 132 with the conductor 147 which extends to the winding of the Back Space magnet 150 (Fig. 9), and from there to the negative conductor 83. The completion of this circuit actuates the Back Space magnet 150, releasing the latch 151, and closing the contacts 152. The making of these contacts completes another circuit extending from the positive conductor 78, over conductor 59, through the winding of the Main relay 130; contacts 131 of the Operation relay 145, conductor 176; thence through the winding of the Back Space clutch 6; over conductor 153 to the contacts 152, and back to the negative conductor 83.

The action of the Back Space clutch has been described in the patents referred to above and hence need not be considered here in detail. In general, the action results in the mechanical retrograde movement of the carriage, due to the pull of the clutch periphery communicated by a link member 149 (Fig. 1) which operates a bell-crank 154. The bell-crank strikes an insulated portion 155, breaking the contacts 152, momentarily making contacts 156, and restoring the latch 151. When the contacts 152 are broken, the clutch releases, and the link mechanism restores to normal. The making of the contacts 156 closes a circuit which actuates the Operation relay 145, and although these contacts are made for an instant only, the Operation relay armature remains in a closed position as long as the key is held down because of the holding circuit in series with the contacts 68. This holding circuit is similiar to the one just described under "Skip" and acts in the same manner to insure single action. Should the key be depressed for a very short interval of time, the Back Space operation will continue until it is finished as the clutch will continue to operate until the bail 154 opens contacts 152 and restores the latch 151 after the actuating force of armature 212 has been removed.

CARD

Depression of the "Card" key CD (Fig. 12) institutes an operation which punches a card in accordance with the data which has been set-up, delivers the punched card to a receiving magazine, and feeds a blank card into the punching die. The "Card" operation may be used at any time to produce a punched card record of the content of the set bar basket without any other result.

When the key CD is depressed, the usual circuits are set up to lock the keyboard. Under the key, a contactor comb consisting of four double contactors, engages eight contact springs, thereby completing four circuits. One of these circuits energizes the Trip magnet 158 as follows:

From the positive conductor 78, through the contacts 84 of relay 103; over the conductor 86, through the lowest contactor on the key CD (Fig. 12), over conductor 157; through the winding of the Trip magnet 158; and thence to the negative conductor 83.

The actuation of the Trip magnet 158 attracts the armature 160 (Figs 1 and 9), breaking contacts 161 and making contacts 162. A link member 163 communicates the action of the armature 160 to the lever assembly 164 which is mounted on a pivot so that, when rotated clockwise, it will disengage the stop member 165, and allow the clutch 8 to be engaged. The details of such clutch mechanisms have been described in full in U. S. Patent No. 1,810,317, issued to Lasker. Engagement of the clutch is for a single cycle only, during which time the cam shaft 10 is rotated by the drive shaft 9, to perform all the functions referred to above.

A second circuit completed by the contact comb of the key CD is as follows: from the positive conductor 78, conductor 59; through the winding of the Main relay 130; contacts 131 of the Operation relay 145; conductor 176, contacts 162 which were made by the circuit just described; thence over the conductor 166 through the third contactor of the key CD; thence over the conductors 167 and 102, through winding of relay 103 to the negative conductor 83. This circuit causes the Set-Up relay 103 to be actuated and the contacts 84 are broken, thereby breaking the circuit through the Trip magnet 158 and returning the stop 165 to normal, where it will disengage the clutch 8 at the end of the first cycle.

When the set-up relay 103 is actuated, it is locked by a circuit which connects through its own contacts 85 and contacts 198 of the Main relay. The locking of relay 103 leaves contacts 84 open and no current in Trip magnet 158, hence the contacts 162 remain open for the remainder of the operation.

The Main relay 130 also remains in its operated condition since it was initially actuated by a circuit from the positive conductor 78; through the winding of relay 130; thence to contacts 131 of relay 145; then over conductor 132 to the contact comb of the card key CD; back over conductor 170 to resistance 129 and to the negative conductor 83. The resistance 129 is included in this circuit in order to limit the current through the Main relay 130 which has a low resistance winding. The Main relay is held operated in order to prevent the premature unlocking of the keyboard in case the card key is lifted before the completion of the operation.

The fourth circuit through the contacts on the key CD is in series with a contactor 172 on the main shaft and is designed to normalize the remaining circuit connections which were set up for this operation.

The cam 171 (Fig. 9) is set on the shaft 10, so that the contacts 172 are made just at the completion of the "Card" operation. The circuit for this finishing action may be traced from the positive conductor 78, through the contacts 172; over the conductor 173, through the first contactor of the key CD; back over conductor 174, through the winding of the Operation relay 145; and thence to the negative conductor 83. The operation of relay 145 opens the contacts 131, thereby breaking the circuits for the Main relay 130, and the Set-Up relay 103, returning these two relays to normal. The cam 171 connects the contacts 172 for only a moment, but the Operation relay remains operated over a holding circuit as follows:

From the positive conductor 78 over conductor 59, through contacts 80 of relay 130; over conductor 81 to the contacts 68 in the keyboard assembly (which are closed because the bar 57 is down), over conductor 75, through contacts 77 in the On-Off switch; back over conductor 175, through the contacts 146 and winding of the Operation relay 145; to the negative conductor 83. As long as this holding circuit remains closed, no operation will occur and there can be no double operation even if the key be held down after the punching action is completed. The holding circuit is broken by the return of the armature 53 of the magnet 55 to the unlock position, thereby breaking the contacts 68. This will happen only when the key is raised and the contacts 37 are closed. If the key is raised before the completion of the operation, the action will continue until the cam 171 makes the contacts 172 and the entire circuit is normalized at the end of the operation.

CARRIAGE RETURN

Depression of the "Carriage Return" key CR (Fig. 12), results in a return of the setting carriage to the margin or intermediate stop without cancellation of any set-up. Only one set of contacts is provided for this key. When these contacts are made the following primary circuit results:

From the positive conductor 78 over conductor 59, winding of relay 130, contacts 131 of the relay 145; thence over the conductor 132, through the contacts of the key CR and back over conductor 136; through winding of Carriage Return magnet 120; and thence to the negative conductor 83.

Actuation of this magnet releases a latch 123 which remains in its unlatched condition until mechanically restored. This restoration is effected at the completion of the operation, hence the "Completed Action" characteristic is accomplished in this mechanical latch. Two contacts, 124 and 125, are made when the latch 123 is released and these complete two other circuits, one of which is traced from the positive conductor 78, through the contacts 124, over the conductor 126; through the contacts 127 of the Retract relay 134; over conductors 105 and 76 to the winding of the Transfer relay 91, and back to the negative conductor 83. The result of this circuit is to cause the Transfer relay to close the "lower" contacts if it happens to be in the "upper" position. If it is already in "lower" position, no change will occur.

The transfer relay will be held operated over the holding circuit which has already been described under the heading "Lower."

The contacts 125 which are also closed by the latch 123, complete a circuit from the positive conductor 78, through the winding of relay 130; through the contacts 131 of the relay 145, over the conductor 176 to the Carriage Return clutch 7; then through the contacts 125, to the negative conductor 83. The result of this circuit is the actuation of the clutch 7, and the automatic return of the setting carriage by mechanical linkages attached to the clutch periphery. A flexible ribbon 180 (Fig. 1) is carried by a pulley 181 and is attached at its extremity to a sliding hook member 182. When the Carriage Return clutch is actuated, the hook member is drawn to the left, engaging a wheel on the setting carriage and pulling it either to the marginal stop 183, or intermediate stop 184. When the carriage reaches the desired stop, engagement is made between a movable carriage block member 185 and either of the stops, 183 or 184. Selection of the proper stop is determined by the amount of elevation of the block member 185 which is controlled by the Express solenoid EXP which communicates its action by means of a Bowden wire.

When one of the stops, 183 or 184, is engaged by the block 185, the stop bar assembly 186 is moved to the left a small amount, against a spring mounting 187, and in so doing engages the latch 123 (see Fig. 9), restoring said latch to its normal position, breaking contacts 124 and 125, and momentarily making contacts 190. The contacts 190 complete a circuit from the positive conductor 78, through the contacts 190, conductor 174; through the winding of Operation relay 145; and thence to the negative conductor 83. This circuit causes the armature of relay 145 to be actuated and locked through contacts 146, thus breaking the contacts 131 and restoring the relay. Operation relay 145 is normalized when the key is raised and contacts 68 are broken.

CANCEL

When a "Cancel" operation is performed, the setting carriage is returned in the same manner as described above but, in addition, the entire field of set bars is released by a cancelling wheel 137, and the transfer relay thrown to its "upper" position. The automatic change back to "upper" can be accomplished only by the operation of the Cancel, Trip, Trip-Int, or Trip-2 Keys.

The Cancelling operation requires two double contactors on the key comb. One of these completes a circuit similar to the Carriage Return contactor, the other connects two conductors, 135 and 136, which complete a circuit from the positive conductor 78 through the winding of the Main relay 130; through the contacts 131 of the Operation Relay 145; thence over conductor 132 through the lowest contact spring of the contact comb of the cancel key CAN; thence over conductor 133 to the winding of the Retract relay 134; over conductor 135 to the upper contact springs of the Cancel key CAN; thence over conductor 136 through the winding of the Carriage Return magnet 120, and the negative conductor 83.

The energizing of the Retract relay 134 breaks the contacts 115 through which the Transfer relay 91 received its holding current, hence the latter's armature is released and the "upper" circuits are again established.

The cancelling roller 137 (Fig. 1) is moved into position by a Bowden wire which is actuated by a Retract solenoid RET (Fig. 10) which receives its operating current through contacts 210 of the Retract relay 134.

CARD, CARRIAGE RETURN

When this operation is performed, the punch perforates a card in accordance with the set-up data and returns the carriage without cancellation to either the margin or intermediate stop. On the contact comb of key CCR, four double contactors complete connections for four circuits as follows: (1) The trip magnet 158 is connected to the supply line; (2) contact 162 of the trip relay is connected to the set-up relay; (3) a holding circuit for relay 130 is provided; and (4) the Carriage Return circuit is connected to the Timer contacts 172, so that the setting carriage will be returned after a card has been perforated. The circuit for the Trip magnet is completed as follows:

From the positive conductor 78 through the contacts 84 of the Set-Up relay 103; thence over conductor 86, through the lowermost contactor of the CCR key; conductor 157, through the winding of Trip magnet 158 to the negative conductor 83. This causes the card to be punched and fed out of the die and a new card is fed into its place, and also rotates the Timer cam 171 so that the contacts 172 are made near the end of the punching operation. When the armature of the Trip magnet is actuated, contacts 162 are made, which complete a circuit which, in conjunction with the key contactor, holds both the Set-Up relay 103 and the Main relay 130 in a similar manner to that explained under "Card." When the relay 103 closes, locking by current from contacts 198, the contacts 84 are broken and since these contacts are in series with the Trip magnet, the armature 160 falls back to its normal position, breaking the contacts 162 and allowing the clutch to disengage at the end of the first revolution.

The Carriage Return circuit for this operation is not the same as the circuit provided for the operation which gives a Carriage Return alone. On a Card, Carriage Return operation, the return of the carriage is started by the switching action of the contacts 172 on revolving cam 171 instead of cam 192. This delays the action of the carriage for a short time only and results in the return without cancellation, but a transfer to "lower." A momentary contact of the points 172 is all that is necessary to unlatch the lever 123 (by actuating coil 120) and make contacts 124 and 125. Since this latch is mechanically set by the return of the carriage, no additional circuit connections are necessary. The circuit is normalized and the keyboard unlocked when the key is released and the carriage return completed. The action of the transfer relay 91 and the circuit through the Margin-Intermediate switch is the same as the action in a Carriage Return operation.

TRIP AND TRIP TO INTERMEDIATE

The "Trip" operation provides that a card be punched, the setting carriage returned to "Margin," and both zones of the set-up field be cancelled. The "Trip to intermediate" operation is similar except that the return is made to the "Intermediate" stop. These two operations differ from that described under "Card, carriage return" only in that cancellation is always made and that the carriage is returned to the margin or intermediate stop regardless of the position of the switch MAR-INT.

When the key Trip is depressed, four double contactors complete four circuits which are: (1) The Trip magnet 158 is connected to the supply line; (2) the contacts 162 are connected to the relay 103; (3) the Operation circuit is connected to the Retract relay 134; and (4) the Operation circuit is connected to the solenoid EXP. The Trip operation is a combination of operations which have already been described in detail and it is only necessary to discuss the differences due to the combined actions. The circuit for the Trip magnet and clutch runs from the positive conductor 78 through the contacts 84 on the Set-Up relay 103; thence over conductor 86 through the comb of the Trip key to the conductor 157; thence through the winding of Trip magnet 158; and thence to the negative conductor 83. The actuation of this magnet, as hereinbefore described, causes the punch clutch to be engaged, punching a card, feeding it out of the die, picking a new card from the stack, and feeding it into the die. At the same time contacts 162 are made which complete a circuit from the positive conductor 78 over conductor 59; through winding of the Main relay 130; through the contacts 131 of relay 145; over conductor 176 through contacts 162; conductor 166, through the contact comb of the key Trip; back over conductor 167 and 102, through the winding of Set-Up relay 103; and thence to the negative conductor 83. This actuates and holds relay 103 operated, breaking the contacts 84 and thereby causing the Trip magnet 158 to be normalized and the contacts 162 to be broken.

Two other circuits start from the positive conductor 78, pass through the winding of relay 130; thence through the contacts 131 of the Operation relay 144; and then over conductor 132 to two points on the contact comb of the Trip key. One of these, the second contact, completes a circuit over conductor 133, through the winding of the Retract relay 134; over conductor 135, through contacts 193; through the winding of Carriage Return magnet 120; to negative conductor 83. The other circuit is traced from the first contact of the key contactor; over conductor 191, through the winding of the Express solenoid EXP; conductor 198, thence through contacts 125, to negative conductor 83. The Retract relay, as has been described, causes actuation of the Retract solenoid which executes the cancelling operation on the set bars as the carriage is returned. The Express solenoid lifts the block member 185 (Fig. 1) and permits the carriage to travel to the marginal stop regardless of the setting of the switch MAR-INT, which normally controls this action.

The Carriage Return operation is not started by the key contacts because it must occur after the punching operation is finished. The cam 192 on the clutch operated shaft, closes contacts 193 thereby completing the circuit described above.

This circuit causes the Carriage Return as hereinbefore described, also the actuation of the Retract relay 134 and therefore the cancellation of all set-ups during the return.

The trip to Intermediate circuit is the same as the Trip circuit, except that the two upper contact springs of the contact comb of the key are in series with the Express solenoid EXP and are normally in contact with each other. When the key is depressed, an insulated projection 194 breaks the contacts and prevents actuation of the Express solenoid so that the carriage always stops at the intermediate position.

At the conclusion of these operations, the Carriage Return latches are reset by the mechanical action of the carriage, as hereinbefore described, and the relay 130 is normalized by the making of the contacts 190 which actuates the Operation relay and breaks the contacts 131 through which all the holding circuits were energized.

TRIP-2

This operation punches two cards with the same data, delivering the cards to separate pockets at the rear of the punch and returns the setting carriage to one of the stops with cancellation of the set-up data.

Depression of the key Trip-2 causes four circuits to be completed by the contact comb. One of these circuits runs from the positive conductor 78 to the contacts 84 of the Set-Up relay 103; thence over conductor 86 to the fourth contact of the key contact comb; back over conductor 157 to the Trip magnet 158; and thence to the negative conductor 83. This circuit causes actuation of the armature 160 of the Trip magnet which engages a clutch and punches a card in a manner hereinbefore described. Also, the contacts 161 are broken and the contacts 162 are made. The contacts 162 complete a circuit which may be traced from the positive conductor 78, through the winding of the Main relay 130; contacts 131, to the contacts 162; thence over the conductor 166 to the first contact key comb, back over conductor 195 to the receiver solenoid 196; and thence to the negative conductor 83. Actuation of the receiver solenoid tilts a deflector plate in the card receiver assembly and deflects the first punched card into one of two pockets at the back of the machine.

During the greater part of this punching operation which produces the first card, the armature 160 remains in its actuated position and is only normalized by the breaking of the contacts 84, of the Set-Up relay. This break occurs near the end of the first revolution of the punch shaft, but not soon enough to prevent a second revolution.

Another circuit established by the contactors of the key Trip-2 runs from the positive conductor 78, through the winding of the Main relay 130 and the contacts 131; over the conductor 176, to the contacts 161; thence over the conductor 144 to the second contact of the key contactor, back over conductor 133 to the Retract resistance 211; and thence to the negative conductor 83. This circuit keeps the Main relay actuated and the keyboard locked during part of the second revolution. Toward the end of the second revolution, the cam 192 makes the contacts 193, and by so doing, switches in another circuit in parallel to the Retract Resistance. This circuit runs from the positive side of this resistance, through the Retract Relay 134; thence over conductor 135, to the cam operated contacts 193; thence through the winding of the Carriage Return magnet 120, to the negative conductor 83. This circuit is not completed until the end of the second punching operation because during the first punching cycle, the contacts 161 are open as the armature 160 of the Trip magnet is in its actuated position. After the start of the second cycle, the armature 160 falls back and makes the contacts 161, but the above circuit is not completed until the cam 192 makes the contacts 193 near the end of the cycle, and thereby operates magnet 120 to release the latch 122 of the Carriage Return assembly. The Carriage Return operation is the same as described hereinabove, made with cancellation of all set-up data due to the actuation of the Retract relay and the energization of the Retract solenoid RET.

The fourth circuit established by the key contactor runs from the positive conductor 78 through the contacts 172; over conductor 173, to the third contact of the Trip-2 key contactor; back over conductors 167 and 102, through the winding of the Set-Up relay 103; thence to the negative conductor 83. The Set-Up relay is locked up as soon as actuated due to the holding circuit; from the positive conductors 78 and 59, through the contacts 198 of the relay 130; through contact 85; and winding of relay 103, to the negative conductor 83. The Set-Up relay remains in its operated condition due to the above holding circuit, until the end of the carriage return, when the mechanical return of the latch 123 causes the contacts 190 to be made, which in turn actuates the Operation relay; breaking contacts 131, and opening the circuit through the Main relay, thereby breaking contacts 198, and removing the Set-Up locking current from this source. However, the Operation relay now being actuated, closes contacts 146, and keeps the Set-Up relay locked by current through these contacts via conductor 174. The final normalizing action occurs when the key is lifted and the keyboard locking circuit is broken at contacts 68.

Each of the cams 171 and 192 make two revolutions and hence cause the contacts to be made twice. The first revolution of cam 171 actuates and locks up the Set-Up relay as described, the second revolution of the cam again completes an actuating circuit for the Set-Up relay, but no change occurs since it is already operated.

The cam 192, which is in advance of cam 171 by about 40°, completes no circuit during the first punching cycle, because the contacts 161 are open as hereinbefore mentioned, but during the second cycle it starts the Carriage Return operation and both cams 171 and 192 have permitted contacts 172 and 193 to open by the time the latch 123 makes the contacts 190, which normalizes the entire circuit. It should be noted that shortly after the start of the second punching cycle the contacts 162 are opened and the Receiver solenoid 196 is de-energized, hence the second card is ejected into the second pocket at the rear of the machine.

REPEAT ACTION

It is sometimes necessary to punch a number of cards, each having the same data therein. This is particularly true in systems of stock accounting where a single card represents a unit container and therefore a great number of cards, each consecutively numbered, must be punched with identical data. The set-up is made as usual and the Single-Repeat switch is thrown to REP position, closing contacts 199, whereat the punch continues to perforate cards without cancellation or carriage movement until stopped. The operating circuit for this arrangement is as follows:

From the positive conductor 78 through the winding of relay 130; through the contacts 131 of the Operation relay; thence over conductor 132; through the Single-Repeat switch contacts 199 (Fig. 11); back over conductor 157, through the winding of the Trip magnet 158; and thence to the negative conductor 83. This actuates the Trip mechanism and causes the clutch to be held in engagement continuously without affecting the rest of the apparatus. When the switch is thrown to REP position, the contacts 200 are broken and the locking magnet 55 is de-energized, thus locking the complete keyboard and preventing the depressing of any key.

While I have described what I consider to be a highly desirable embodiment of my invention, it is obvious that many changes in form could be made without departing from the spirit of my invention, and I, therefore, do not limit myself to the exact form herein shown and described, nor to anything less than the whole of my invention as hereinbefore set forth, and as hereinafter claimed.

What I claim as new, and desire to secure by Letters Patent, is:

1. In a card punching machine, the combination of a card punching mechanism, a series of keys to control said mechanism, means for locking the unactuated keys in their normal position when one key has been actuated; said means comprising a pair of contacts in series with a source of electric current and an electromagnet, and an armature released by said electromagnet when said contacts are broken, the said armature when in its released position being adapted to block all said keys.

2. In a card punching machine, the combination of a card punching mechanism, a series of keys to control said mechanism, means for locking the unactuated keys in their normal position when one key has been depressed; said means comprising a pair of contacts adapted to be broken by the actuation of a key, and an electromagnet in series with said contacts and a source of electric current, and an armature released by said electromagnet when said contacts are broken, the armature when in its released position being adapted to block all said keys and means for displacing into contact position a multiple contact bar, the contacts of which are adapted to complete electric circuits controlling the punch settings and operations.

3. In a card punching machine, the combination of a punching mechanism, a series of keys to control said mechanism, means for locking the unactuated keys in their normal position when one key has been depressed; said means comprising a pair of contacts adapted to be broken by the depression of said key and an electromagnet in series with said contacts and a source of electric current, and an armature released by said electromagnet when said contacts are broken, the armature when in its released position being adapted to block all said keys; and means for displacing into contact position a multiple contact bar, the contacts of which are adapted to complete electric circuits controlling the punch settings and operations, said means being actuated partially by said depressed key and partially by the armature member.

4. In a card punching machine, the combination of a card punching mechanism, a set-up mechanism for selectively determining which of said punches shall be rendered effective for gang punching and a series of keys comprising data keys and operation keys, said series of keys engaging a series of mechanical members with means for preventing the motion of all said keys after one key has been depressed, said means comprising the combination of an armature, an electromagnet, a pair of contacts and a source of electric current, so disposed and arranged to cause the breaking of said contacts when any one key is depressed, thereby releasing the armature from the electromagnet and blocking said keys.

5. In a card punching machine, the combination of a card punching mechanism, a set-up mechanism for selectively determining which of said punches shall be rendered effective for gang punching, a series of keys comprising data keys and operation keys, said series of keys engaging a series of mechanical members with means for locking the undepressed keys in their normal position when one key has been actuated; said means comprising a pair of contacts in series with a source of electric current and an electromagnet, having an armature released by said electromagnet when said contacts are broken, the armature adapted to block the movement of all key mechanisms when in its released position.

6. In a card punching machine, the combination of a card punching mechanism, a set-up mechanism for selectively determining which of said punches shall be rendered effective for gang punching, a series of keys comprising data keys and operation keys, said series of keys engaging a series of mechanical members; means for locking the undepressed keys in their normal position when one key has been actuated; said means comprising a pair of contacts in series with a source of electric current and an electromagnet, having an armature released by said electromagnet when said contacts are broken, the armature being adapted to block the movement of all keys when in its released position; means for displacing into contact position a multiple contact member, the contacts of which are adapted to complete electric circuits controlling the punch settings and operations, and means for actuating a single pole double throw switch which transfers the path of the said electromagnet energizing current from a circuit containing a switch opened by the start of an operation to a circuit containing a switch closed by the finish of an operation.

7. In a card punching machine, the combination of a plurality of settable pins, a plurality of punches operated by the pins when set, a plurality of keys which control the setting of said pins, an electromagnet, an armature lever rotated by said electromagnet, electrical switch contacts connected in series with a source of electric current supply and the said electromagnet, and a key actuated lever mechanism for breaking said contacts whenever a key is depressed, with a portion of said mechanism so disposed as to be mechanically engaged by one end of said armature lever when released by said electromagnet.

8. In a card punch of the class described, a keyboard consisting of data keys and operation keys in combination with an electromagnet, an armature lever rotatably mounted and operated by said electromagnet, electrical switch contacts connected in series with a source of electric current supply and the said electromagnet, means for separating said switch contacts whenever any key is depressed and means for preventing the depression of any other key before the depressed key is released.

9. In a card punch of the class described, a keyboard consisting of data keys and operation keys in combination with an electromagnet, an armature lever pivotally mounted and rotated by the energizing of said electromagnet, electrical switch contacts connected in series with a source of electric current supply and the said electromagnet, means for separating said switch contacts when a key is depressed, said means comprising a member of the key mechanism in engagement with a leaf of the contact spring, and means for preventing the depression of any other key before the depressed key is released.

10. In a card punch of the class described, a keyboard consisting of data keys and operation keys in combination with an electromagnet, an armature pivotally mounted and rotated by the current in said electromagnet, electrical switch contacts connected in series with a source of electric current supply and the said electromagnet, means for separating said switch contacts when a key is depressed and means for preventing the depression of any other key before the depressed key is released, said means comprising the engagement of one end of the said armature when in its released position with a member of the key mechanism.

11. In a card punch of the class described, a keyboard consisting of data keys and operation keys in combination with an electromagnet, an armature pivotally mounted and rotated by the current in said electromagnet, a single pole double throw switch operated by the said armature, the said switch transferring the path of the said electromagnet energizing current from a switch opened by the start of an operation to a circuit containing a switch closed by the finish of an operation.

12. In a card punch of the class described, a keyboard consisting of data keys and operation keys in combination with an electromagnet, an armature pivotally mounted and adapted to be rotated by the energizing of said electromagnet, a single pole double throw switch positioned so as to be operated by the said armature member, the said switch electrically connected to transfer the energizing circuit of said electromagnet to a switch operated at the conclusion of an operation.

13. In a card punch of the class described, a keyboard containing data keys and operation keys in combination with an electromagnet, an armature in operative relation thereto, two contact switches controlled respectively by the said armature and the said keys and an energizing circuit containing in series arrangement, a source of electric current, the winding of said electromagnet, the two contact switches and a switch closed by the completion of a punch operation.

14. In a card punch of the class described having a keyboard with keys to control all the data to be punched and the operations to be effected, the combination of a lock bail controlled by an electromagnetic winding and operating means for moving the said bail at the start and conclusion of a punch operation, said lock bail so positioned as to lock all the keys when the said winding is de-energized and unlock the keys when the winding is energized, said operating means comprising a plurality of switch contacts, each connected in series with the said winding and operated by the key, lock bail, and the mechanism controlled by the start and finish of a punch operation.

15. In a card punch of the class described having a punch die, a set-up field and electric power operated driving mechanisms, the combination of a keyboard having a plurality of data and operation keys, a plurality of electric contact bars disposed one under each key; a power operated lock bar with means for engaging and locking in a contacting position a contact bar when its corresponding key is depressed, and means for locking in a non-contacting position, all other contact bars.

16. In a card punch of the class described having a punch die controlled by a plurality of keys in a keyboard, the combination of a plurality of contact bars, one for each key, and a power operated locking bail adapted to move said contact bar into electrical engagement with a plurality of contact springs when its corresponding key has been depressed.

17. In a card punch of the class described having a punch die and operated by a plurality of keys in a keyboard, the combination of a plurality of contact bars with a locking bail, the said contact bars positioned one each under each of the said keys and selectively engaged thereby, the said locking bail operatively controlled by an electromagnet and so positioned as to engage a portion of one of said contact bars when the bar has been moved into engaging position by its associated key.

18. In a card punch of the class described having a punch die and operated by a plurality of keys in a keyboard, the combination of a plurality of contact bars, one under each key, and a locking bail, the said contact bars being moved into an engaging position whenever its corresponding key is depressed, and the said locking bail engaging a portion of said contact member and moving it into contact with a plurality of contact springs.

19. In a card punch of the class described having a punch die with punches and a controlling field of settable bars, the combination of a locked keyboard with a plurality of keys, each with a corresponding contact bar and a key locking mechanism, said mechanism consisting of a power operated locking bail adapted to engage the said contact bars by blocking their movement when in an unkeyed position, and by engaging a portion of said contact bar and causing it to move into contact with a plurality of contact springs when in a keyed position.

20. A keyboard for controlling the operations of a recording machine, comprising a plurality of keys, each with two sets of contacts, an electromagnet controlling a locking bail, circuit means for connecting one of said sets of key contacts in series with the electromagnet when the key is being depressed, and additional circuit means for connecting the second of said sets of key contacts in series with the electromagnet by the key as it is rising.

21. A keyboard for controlling and operating a recording machine comprising a plurality of keys, each controlling an operation of said machine, locking means for retaining all unactuated keys in their undepressed position when a key has been depressed, means for maintaining said locking means until the actuated key has been released and the operation has been concluded, and additional locking means for retaining the actuated key in its undepressed position after it has been released, until the operation is concluded.

22. A keyboard for controlling and operating a recording machine comprising a plurality of keys, each controlling an operation of said machine, locking means for retaining all unactuated keys in their undepressed position when two or more keys have been depressed, means for maintaining said locking means until all actuated keys have been released and the operations have been concluded, and additional locking means for retaining all the actuated keys in their undepressed position after they have been released, until all operations have been concluded.

23. A keyboard for controlling and operating a recording machine comprising a plurality of keys, each controlling an operation of said machine, locking means for retaining all unactuated keys in their undepressed position when a key has been depressed, said means comprising an electromagnetically operated locking bail adapted to engage a portion of the key mechanism, means for maintaining said locking means until the actuated key has been released and the operation has been concluded, and additional locking means for retaining the actuated key in its undepressed position after it has been released, until the operation is concluded.

24. A keyboard for controlling and operating a recording machine comprising a plurality of keys, each controlling an operation of said machine, locking means for retaining all unactuated keys in their undepressed position when a key has been depressed, said means comprising an electrically operated locking bail adapted to engage a portion of the key mechanism, means for maintaining said locking means until the actuated key has been released and the operation has been concluded, said means comprising a source of electrical current, electrical switch contacts and an electromagnet; and additional locking means for retaining the actuated key in its undepressed position after it has been released, until the operation is concluded.

25. A keyboard for controlling and operating a recording machine comprising a plurality of keys, each controlling an operation of said machine, and locking means for retaining actuated keys in their normal or undepressed position after said keys have been depressed and released before the completion of said operation, said means comprising a pivoted lever mounted on a locking bail adapted to engage a stop lever connected with the key mechanism.

26. A keyboard for controlling and operating a recording machine comprising a plurality of keys, each controlling an operation of said machine, and locking means for retaining actuated keys in their normal or undepressed position after said keys have been depressed and released before the completion of said operation, said means comprising a pivoted lever mounted on a locking bail adapted to engage a stop lever connected with the key mechanism, when the actuating key has been raised before the completion of the controlled operation.

WALTER F. KELLEY.